United States Patent
John et al.

(10) Patent No.: US 8,430,289 B2
(45) Date of Patent: *Apr. 30, 2013

(54) METHOD FOR CUTTING A CONTINUOUS GLASS SHEET DURING THE PRODUCTION OF FLAT GLASS

(75) Inventors: Thomas John, Mellingen (DE); Andreas Morstein, Jena (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,177

(22) Filed: Dec. 22, 2011

(65) Prior Publication Data

US 2012/0104065 A1    May 3, 2012

Related U.S. Application Data

(63) Continuation of application No. 10/523,850, filed as application No. PCT/EP03/08417 on Jul. 30, 2003, now Pat. No. 8,123,094.

(30) Foreign Application Priority Data

Aug. 16, 2002 (DE) .................................. 102 37 478

(51) Int. Cl.
   *B65H 35/10*    (2006.01)
(52) U.S. Cl.
   USPC .......... 225/4; 225/1; 225/93; 83/879; 83/880; 83/881

(58) Field of Classification Search ................... 225/1–5, 225/93–96.5, 98, 103–105; 83/879–884, 83/886

See application file for complete search history.

(56) References Cited

U.S. PATENT DOCUMENTS

| 3,280,677 | A | * | 10/1966 | Grzymislawski | 83/881 |
| 3,821,910 | A | * | 7/1974 | Tjaden | 83/881 |
| 3,880,028 | A | * | 4/1975 | Frederick, Jr. | 83/880 |
| 3,991,636 | A | * | 11/1976 | Devillers | 83/886 |
| 5,038,654 | A | * | 8/1991 | Mackey | 83/880 |
| 5,791,971 | A | * | 8/1998 | Dickinson et al. | 451/11 |
| 5,860,349 | A | * | 1/1999 | Takeda | 83/881 |

FOREIGN PATENT DOCUMENTS

JP      1994-102480    *  4/1994

* cited by examiner

*Primary Examiner* — Phong Nguyen
(74) *Attorney, Agent, or Firm* — Michael J. Striker

(57) ABSTRACT

In the method for cutting a continuously moving glass sheet with an inhomogeneous thickness distribution across the glass sheet, a cutting tool is moved across it at an angle to its travel direction to form a fissure and then the glass sheet is broken along the fissure. To avoid premature breakage in thin regions the applied cutting force is controlled by a controller based on control commands so that the cutting force is decreased when the glass sheet thickness decreases and is increased when it increases. In a preferred embodiment cutting force switchover points are based on an initial measurement of the thickness distribution. In another embodiment the thickness is continuously measured and the applied cutting force is automatically adjusted accordingly, so that the cutting force is greater when the thickness is greater, and vice versa.

3 Claims, 3 Drawing Sheets

METHOD FOR CUTTING A CONTINUOUS GLASS SHEET DURING THE PRODUCTION OF FLAT GLASS

CROSS-REFERENCE

This is a continuation of U.S. patent application Ser. No. 10/523,850, filed on Feb. 7, 2005, which has now been allowed as U.S. Pat. No. 8,123,094. The aforesaid U.S. Patent Application is the U.S. National Stage of PCT/EP 2003/008417, filed on Jul. 30, 2003, which claims the benefit of priority of invention based on German Patent Application 102 37 478.3, filed on Aug. 16, 2002. The invention described and claimed in the aforesaid U.S. patent application Ser. No. 10/523,850, is also described in German Patent Application 102 37 478.3.

BACKGROUND OF THE INVENTION

The present invention relates to a method for cutting a continuous glass sheet during the production of flat glass with an inhomogeneous thickness distribution across its width by moving a cutting tool at an angle to the direction of travel across the width of the glass sheet with a cutting force predetermined by a controller, producing a fissure, then mechanically breaking the glass sheet along the fissure.

Flat glass, in contrast to hollow glass ware, is understood to mean all glasses manufactured with a flat shape, independent of the production technology used.

In addition to the float glass process, various down-draw methods are used today to manufacture flat glasses, such as overflow fusion, redraw and nozzle processes, and various up-draw processes, such as the Fourcault or Asahi process, for shaping. The glass is shaped into a glass sheet while it is still in a viscous state due to the high operating temperatures. The glass sheet is then cooled, whereby the temperature of the glass passes the two annealing points and then cools to essentially room temperature.

The continuously-produced glass sheet is subsequently cut into panels in various final and intermediate formats in a cross-cutting machine at an angle to the direction of flow. To this end strain states induced by a mechanical small cutting wheel or thermally induced, e.g., using a laser beam are typically used to produce a rupture in the glass surface, i.e., a crack or notch, which is continued across the width of the sheet; subsequently, the microscopically small fissure that results or was continued across the width of the sheet is driven through, using external forces, until it reaches the other side and the glass sheet is divided into separate pieces.

During the shaping of the glass sheet, a somewhat different thickness distribution usually forms on the edges than in the center or net-usable-surface area due to surface forces, temperature and viscosity gradients and also as a result of the action of mechanical shaping and conveyance tools, such as rollers. The thickness in the edge regions can become smaller than in the net-usable-surface area, as is the case with the nozzle process using the down-draw method, or larger than in the net surface area, as is the case with the float glass process. The edge region on either side of the glass sheet is referred to as the border region.

This inhomogeneous thickness distribution across the width of the glass sheet becomes noticeable during production of thin glass (<3 mm) in particular.

During cross-cutting, depending on the system, a small cutting wheel is typically moved across the glass surface with pressure, with the objective of mechanically creating a notch (fissure) across the entire width of the glass sheet. The glass sheet is not divided into separate pieces yet, however. The glass sheet is broken at the fissured point in a further working step.

With the known systems, the cutting force with which the cross-cutting of the particular glass sheet is carried out is set at a constant value by the operator of the cross-cutting machine in the associated electrical controller. If the cross-cutting procedure is then carried out using a cutting force with a constant setting, the following two states result:

1. The cutting force is set at a level that enables an adequate surface notch to be created in the thicker regions, and breaking can then be carried out successfully. In the thin regions of the glass sheet, the glass is acted upon with excessive cutting force. As a result, the glass is broken into pieces in an uncontrolled manner, before the actual breaking process can be carried out.
2. The cutting force is set at a level that enables an adequate surface notch to be created in the thin regions, and the glass remains intact. An inadequate notch is created in the thicker regions and, above all, the roller tracks, however. In the subsequent breaking procedure, the borders are therefore either not broken or are broken in an uncontrolled manner.

In either case, as a result of the uncontrolled breaking, the net glass separated from the border region cannot be used, or it can be used only if additional work is performed.

The same applies for cross-cutting using thermally induced strain states, e.g., using a laser beam with a constant output, combined with a mechanical starting point of a fracture created using a cutting tool.

SUMMARY OF THE INVENTION

The object of the present invention is to carry out the method, described initially, for cutting a glass sheet with regard for the cutting force applied such that the border and net region are fissured enough to perform the breaking procedure correctly, while preventing the glass sheet from separating into parts prematurely.

According to the present invention, this object is attained with a method for cutting a continuous glass sheet during the production of flat glass with an inhomogeneous thickness distribution across its width, which comprises moving a cutting tool at an angle to the direction of travel across the width of the glass sheet with a cutting force predetermined by a controller, producing a fissure, then mechanically breaking the glass sheet along the fissure when the cutting force, adapted to the glass thickness, is actively specified by the controller.

The present invention is therefore based on a method for applying a cutting force adapted to the glass thickness by designing the actively specified force of the cutting tool acting on the glass sheet during cross cutting not to be constant across the width of the sheet, but variable.

In other words:

According to the present invention, the cutting force is actively varied as a function of the position coordinates of the contact point of the cutting tool at an angle to the direction of flow of the glass sheet. A stronger cutting force is applied in the edge regions (borders), for example, of a floated glass sheet with greater glass thickness, and, in the net region of the floated glass sheet, a lesser cutting force adjusted for the lower glass thickness is applied. The distribution of the cutting force is reciprocal thereto in the case of glass sheets with thinner borders produced using the down-draw method.

U.S. Pat. No. 3,282,140 A describes a method for cutting a continuous glass sheet during the production of flat glass by moving a cutting tool across the width of the glass sheet at an angle to the direction of travel, producing a fissure, then mechanically breaking the glass sheet along the fissure. The cutting tool is thereby retained in a holder using a spring or a pneumatic cylinder or a combination of both such that the cutting tools bears with elastic resilience on the glass sheet surface with a predetermined amount of pressure. The cutting force is not actively varied by the spring and/or the pneumatic cylinder as it traverses the glass sheet. At most, the cutting force can be changed as a function of the distance between the glass sheet surface and the cutting tool with consideration for the spring force constants and/or the characteristic curve of the pneumatic cylinder. With the method according to the present invention, the cutting force is not predetermined passively using a spring or a pneumatic cylinder. Instead, it is predetermined electrically using a controller, and it is actively influenced by it, i.e., as a function of the technological circumstances and the inputs made by the system operators. This approach makes it possible to adapt the cutting force during on-going production to the technological circumstances while making the cut or between cuts without the need to mechanically convert the cutting device, because the mechanical properties of a spring and/or the characteristic curve of a pneumatic cylinder limit the range of variation of the cutting force.

Similar cutting systems are described in GB 1 485 000 A and DD 115 644 A, the cutting heads of which are configured such that different distances between the glass sheet surface and the cutting head, caused by surface irregularities or fluctuations in glass thickness, for example, are corrected by a spring-loaded shaft. The disadvantages are the same as those described above for U.S. Pat. No. 3,282,140. Neither publication includes mention of an active control of the cutting force.

According to a further development of the present invention, a method is provided with which the position of the cutting tool is detected continuously during its cross-cutting motion and, depending on the position of the cutting tool, the controller applies an appropriately adapted cutting force in the region of the glass sheet with constant glass thickness and, in the regions with greater or smaller glass thickness, the controller applies a cutting force that is increased or reduced accordingly. It is simplest when the position-dependent switchover points for the cutting force are predetermined in a fixed manner in the controller, e.g., based on experiential values measured across the width of the border regions and the change in glass thickness in these regions compared with the net region of the glass sheet.

According to a further development of the present invention, the cutting force used in the method, which is adapted to the glass thickness, is predetermined in a fixed manner in the controller as a function of an initial measurement of the thickness distribution. Very satisfactory results are obtained with a method of this type, since, based on experience, the distribution of the glass thickness does not vary significantly over the course of the glass sheet.

Optimized implementation of the method is given when the glass thickness is detected continuously by the sensors during cross-cutting and the cutting force is automatically adjusted as a function thereof. When this method is implemented in this manner using a controller, changes in glass thickness distribution are also detected over the course of the glass sheet.

The method according to the present invention is capable of being carried out such that the fissure is produced mechanically using a small cutting wheel, and the cutting force is predetermined by the force of the small cutting wheel on the glass sheet.

As an alternative, the fissure can also be produced by inducing a thermo-mechanical strain, and the cutting force can be adjusted via the output of a heat source. A laser beam is typically used to produce the thermo-mechanical strain.

BRIEF DESCRIPTION OF THE DRAWING

The present invention is described in greater detail with reference to an exemplary embodiment shown in the drawing.

DETAILED DESCRIPTION OF THE INVENTION

Figure 1:
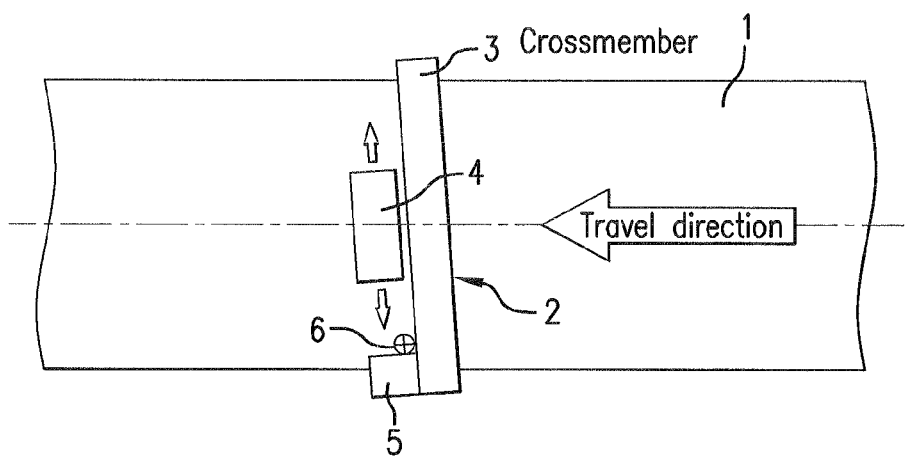
FIG. 1 is a top plan view of the cross-cutting region for cutting a continuous glass sheet.

FIG. 1 shows a glass sheet 1 that is drawn continuously in the direction of the arrow, and that is cut at an angle to the direction of drawing while the sheet is moving, using a cross cutter 2. To this end, the cross cutter is located at a certain angle to the direction of flow.

A system of this type is known per se, e.g., from U.S. Pat. No. 3,282,140 referenced initially.

Figure 2A:
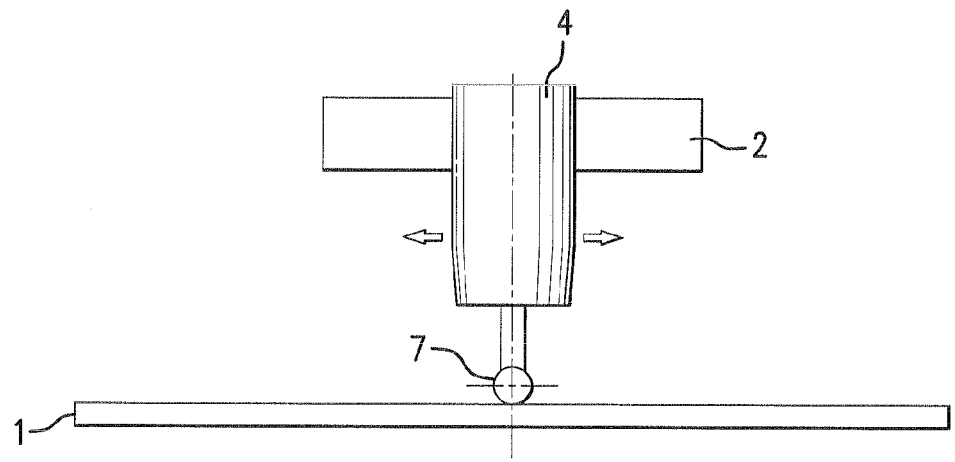
FIG. 2a is a vertical cross-sectional view through a cross-cutter shown in FIG. 1 for performing the method according to the invention.

As also shown in FIG. 2a, the cross cutter is composed of a crossmember 3 extending transversely across the width of the glass sheet 1, on which a cutting head 4 is mounted in a longitudinally displaceable manner. A drive arrangement 5 is provided to move the cutting head, and a home-position sensor 6 detects when the cutting motion starts. Cutting head 4 includes, in a known manner, a small cutting wheel 7 that is pressed against glass sheet 1 with a predetermined amount of force and produces a fissure at an angle to the width of the sheet when the cutting head 4 moves. The glass sheet 1 is not separated into pieces yet. The glass sheet is broken at the fissured point in a further working step.

Figure 2B:
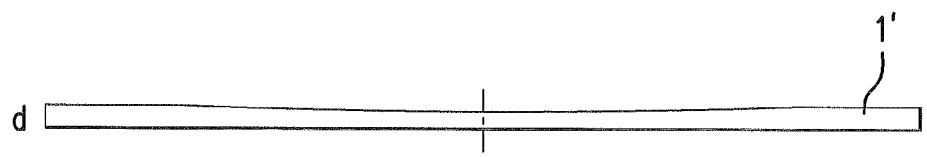
FIG. 2b is a graphical representation of a real inhomogeneous thickness distribution of a thickness, d, of a glass sheet.

As described initially, the thickness distribution of glass sheet 1 is not homogeneous along the cross-cut to be carried out. When flat glass is produced in float systems, the glass thickness in the outer regions, the "borders", i.e., to the left and right of the net and/or good glass, is usually greater than within the net glass sheet. This real inhomogeneous thickness distribution is shown in FIG. 2b. If the cross-cutting procedure according to the related art is carried out using a cutting force with a constant setting, the following two conditions result.

Figure 2C:
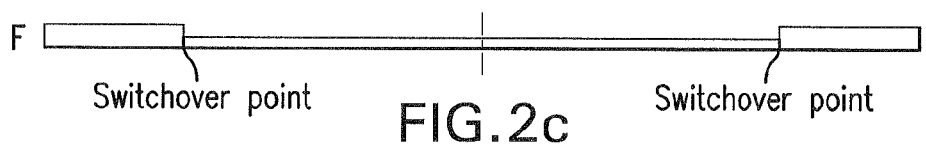
FIG. 2c is a graphical representation of a distribution of a cutting force F associated with the thickness distribution shown in FIG. 2b.

1. The cutting force is set at a level that enables an adequate surface notch to be produced in the edge regions, and breaking can then be carried out successfully. In the net region of the glass sheet, however, the glass is acted upon with excessive cutting force. As a result, the glass is broken into pieces in an uncontrolled manner, before the actual breaking process can be carried out.
2. The cutting force is set at a level that enables an adequate surface notch to be created in the net region, and the glass remains intact. An inadequate notch is created in the edge regions and, above all, the roller tracks, however. As a result, the borders are therefore either not broken or are broken in an uncontrolled manner in the subsequent breaking procedure. To prevent these disadvantages, cutting force F is varied—as also shown in FIG. 2c—as a function of the position coordinates of the contact point of small cutting wheel 7 on the glass sheet in a stroke at a right angle to the direction of flow of the glass sheet. A stronger cutting force is applied in the edge regions having greater glass thickness, and a lesser cutting force is applied in the net region.

With the exemplary embodiment of the present invention according to FIGS. 2a to 2c, two switchover points are provided that are predetermined in a fixed manner by a controller. The cutting force adapted to the glass thickness is set in a fixed manner as a function of an initial measurement of the thickness distribution.

A method is also feasible, however, with which the glass thickness is detected continuously during cross cutting and the cutting force is automatically adjusted as a function thereof.

Figure 3:
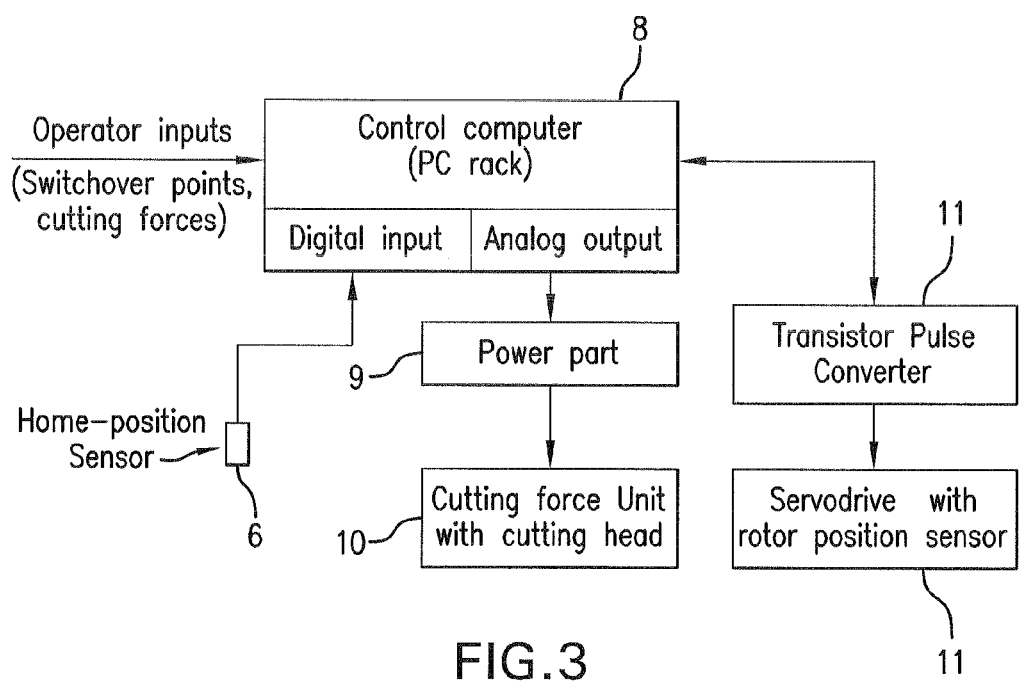
FIG. 3 is a block diagram showing the layout of a controller for adjusting the cutting force as a function of glass thickness.

FIG. 3 shows an exemplary embodiment of a controller for adjusting the cutting force as a function of glass thickness. The controller includes a control computer 8, in which operator inputs, such as switchover points and cutting forces, are entered. It includes a digital input that is connected with home-position sensor 6. It also includes an analog output that is connected via a power part 9 with stage 10, which represents drive 5 for the cutting head, and the stage in cutting head 4 for adjusting the cutting force. The control computer 8 is further connected with two stages 11, which are connected with position sensors on the crossmember 3, allowing the control computer to always know the position of the cutting head and, therefore, small cutting wheel 7, and enabling it to carry out appropriate measures in accordance with the operator inputs. If the position of switchover points shown in FIG. 2c is entered, for example, the switchover to a cutting force—which was also set in advance—takes place automatically as a function of the signals of stage 11.

Another advantage of the method according to the present invention is that only a minimal change need be made to the existing cutting device, since existing sensors and triggering devices can be used.

While the invention has been illustrated and described as embodied in a method of cutting a continuous glass sheet during the production of flat glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of cutting a continuously moving glass sheet during production of flat glass with an inhomogeneous thickness distribution across the glass sheet, said method comprising the steps of:
   a) providing a moving glass sheet that is continuously moving in a travel direction;
   b) moving a cutting tool across the moving glass sheet at an angle to the travel direction of the moving glass sheet so that the cutting tool traverses different regions of the glass sheet with different glass sheet thicknesses;
   c) during the moving of the cutting tool across the moving glass sheet over said different regions of said glass sheet, applying different cutting forces to the moving glass sheet in said different regions of the glass sheet so that a fissure is formed in the glass sheet;
   d) measuring said inhomogeneous thickness distribution across the glass sheet to determine said different thicknesses in said different regions;
   e) during the moving of the cutting tool across the moving glass sheet to form said fissure, adjusting the different cutting forces applied to said moving glass sheet in said different regions according to said different thicknesses of said glass sheet in said different regions determined during said measuring of step d), so that said different cutting forces are increased when said different thicknesses increase and said different cutting forces are decreased when said different thicknesses decrease; and then
   f) mechanically breaking the glass sheet along the fissure;
   g) controlling said different cutting forces applied by said cutting tool in said different regions so that said different cutting forces are increased when said different thicknesses increase and said different cutting forces are decreased when said different thicknesses decrease so as to be sufficient to form said fissure but not so large as to cause uncontrolled breaking of said glass sheet during formation of the fissure prior to the mechanically breaking.

2. The method according to claim 1, further comprising detecting a position of the cutting tool continuously with a position sensor during the moving of the cutting tool across the glass sheet and, depending on the position of the cutting tool, applying an appropriately adapted cutting force in one of said regions of the glass sheet having a constant thickness and applying another cutting force increased or decreased in relation to the appropriately adapted cutting force in another of said regions of said glass sheet having respectively greater or smaller thickness than in said one of said regions.

3. A method of cutting a continuously moving glass sheet during production of flat glass with an inhomogeneous thickness distribution across the glass sheet, said method comprising the steps of:
   a) providing a moving glass sheet that is continuously moving in a travel direction;
   b) moving a cutting tool across the moving glass sheet at an angle to the travel direction of the moving glass sheet so that the cutting tool traverses a plurality of positions on the glass sheet;
   c) during the moving of the cutting tool across the moving glass sheet, continuously measuring respective glass sheet thickness values of the moving glass sheet;
   d) during the moving of the cutting tool across the moving glass sheet, applying variable cutting forces to the moving glass sheet at corresponding points of contact of the cutting tool with the glass sheet so that a fissure is formed in the glass sheet;
   e) mechanically breaking the glass sheet along the fissure; and
   f) automatically controlling said variable cutting forces applied by the cutting tool at said corresponding points of contact of the cutting tool with the moving glass sheet so that said variable cutting forces at said points of contact are larger when said thickness values are larger and so that said variable cutting forces at said points of contact are smaller when said thickness values are smaller so as to be sufficient to form said fissure but not so large as to cause uncontrolled breaking of said glass sheet during formation of the fissure prior to the mechanically breaking.

* * * * *